Figure 10:
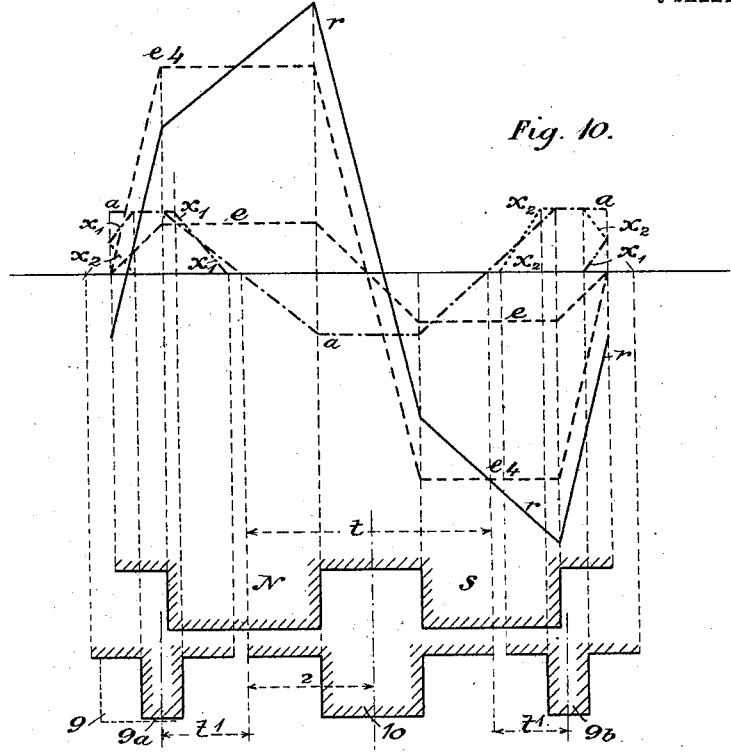
Figure 11:
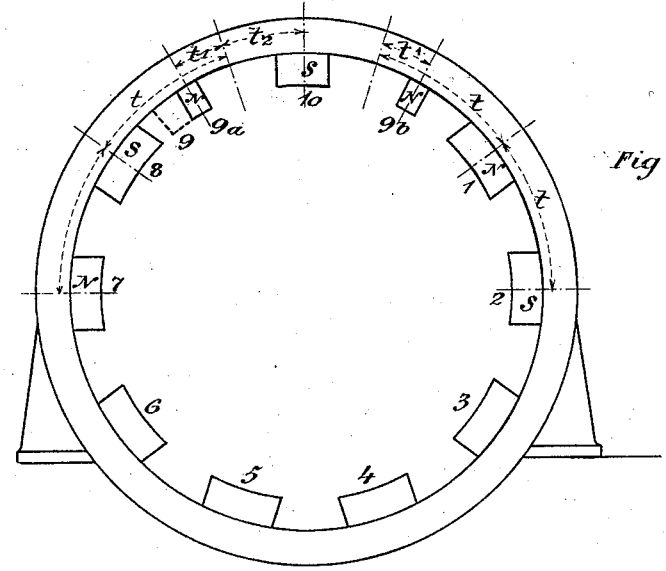

No. 756,793. PATENTED APR. 5, 1904.
H. LIPPELT.
ELECTRICAL INDUCTION MACHINE.
APPLICATION FILED JAN. 13, 1903.
NO MODEL. 9 SHEETS—SHEET 1.
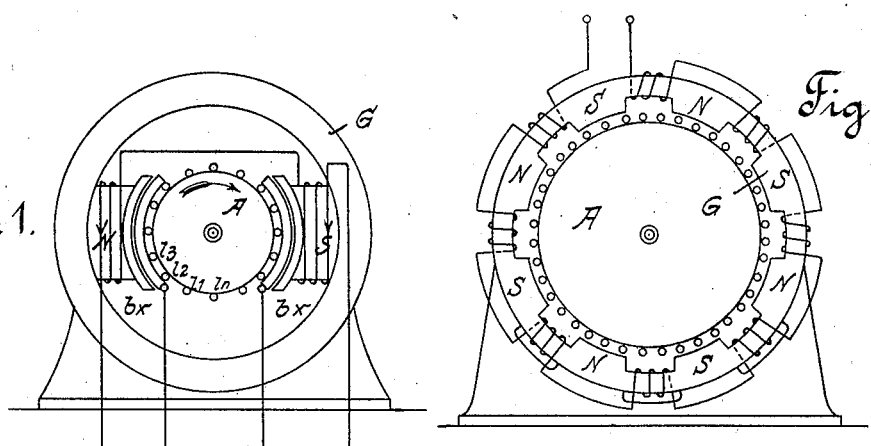
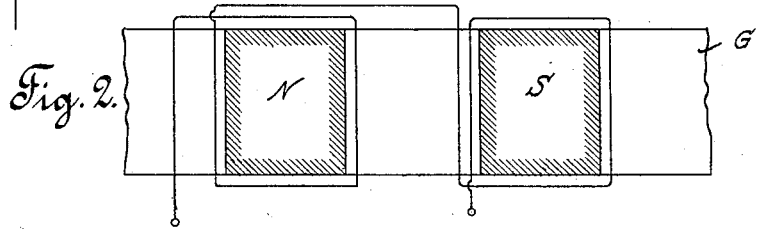
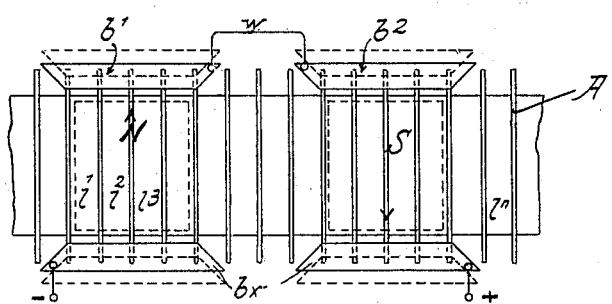
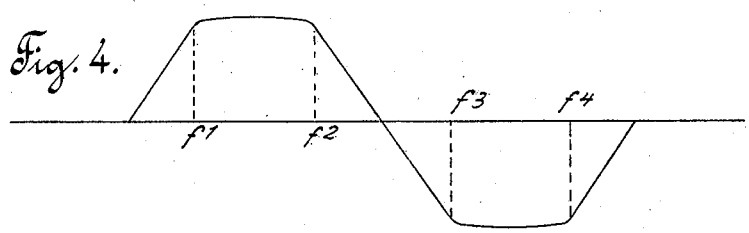
Witnesses Inventor:
Hans Lippelt.
By his Attorney No. 756,793. PATENTED APR. 5, 1904.
H. LIPPELT.
ELECTRICAL INDUCTION MACHINE.
APPLICATION FILED JAN. 13, 1903.
NO MODEL. 9 SHEETS—SHEET 2.
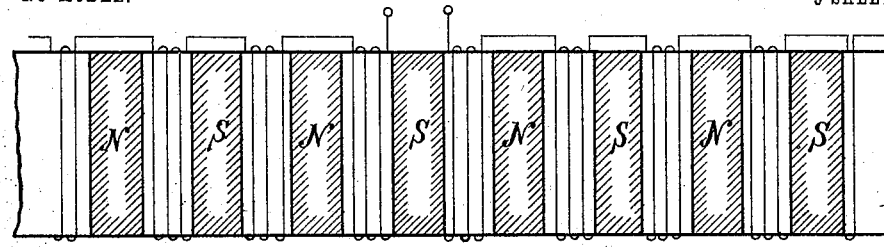
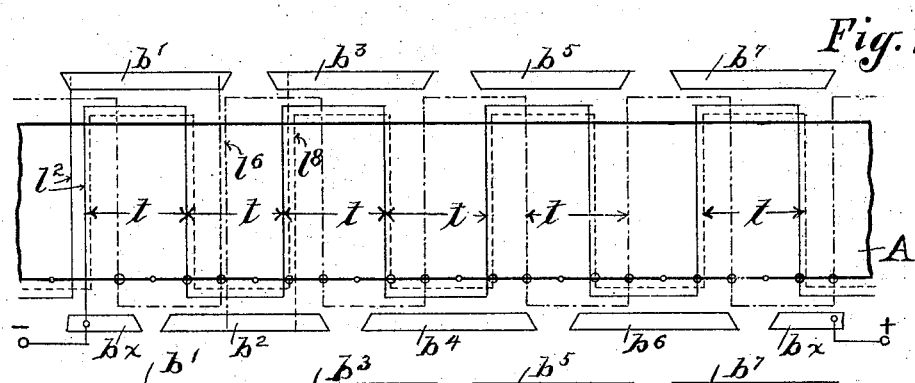
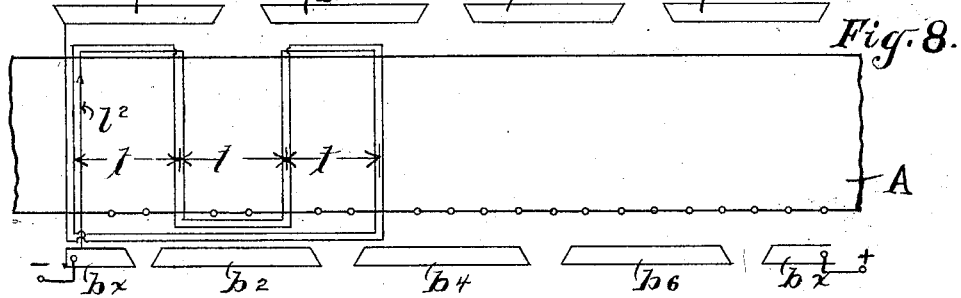
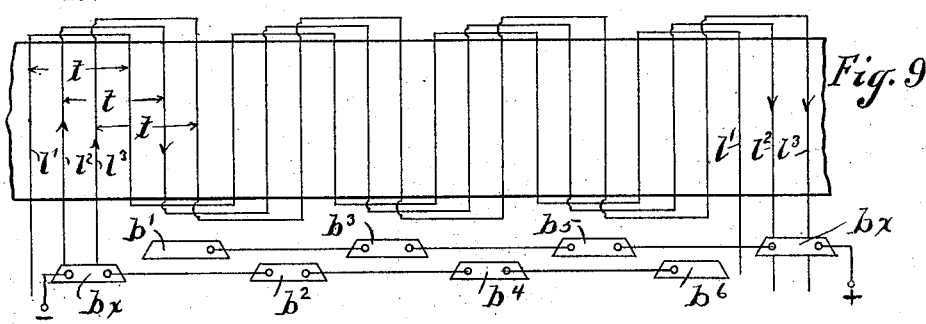
WITNESSES
INVENTOR:
Hans Lippelt
BY
ATTORNEY:

No. 756,793. PATENTED APR. 5, 1904.
H. LIPPELT.
ELECTRICAL INDUCTION MACHINE.
APPLICATION FILED JAN. 13, 1903.
NO MODEL. 9 SHEETS—SHEET 3.

WITNESSES:
Augusto Dima
Raena H. Gudifky

INVENTOR:
Hans Lippelt,
BY
Attorney

No. 756,793. PATENTED APR. 5, 1904.
H. LIPPELT.
ELECTRICAL INDUCTION MACHINE.
APPLICATION FILED JAN. 13, 1903.
NO MODEL. 9 SHEETS—SHEET 4.

WITNESSES:
Augusto Dina
Raena H. Yudizky.

INVENTOR:
Hans Lippelt,
BY
ATTORNEY.

THE NORRIS PETERS CO., PHOTO-LITHO., WASHINGTON, D. C.

No. 756,793. PATENTED APR. 5, 1904.
H. LIPPELT.
ELECTRICAL INDUCTION MACHINE.
APPLICATION FILED JAN. 13, 1903.
NO MODEL. 9 SHEETS—SHEET 7.

WITNESSES:
INVENTOR:
Hans Lippelt
BY
ATTORNEY.

No. 756,793. PATENTED APR. 5, 1904.
H. LIPPELT.
ELECTRICAL INDUCTION MACHINE.
APPLICATION FILED JAN. 13, 1903.
NO MODEL. 9 SHEETS—SHEET 8.

WITNESSES:
Geo. W. Eisenbach
Raena N. Yurdizky

INVENTOR:
Hans Lippelt
BY
A. Faber du Faur
ATTORNEY.

No. 756,793. PATENTED APR. 5, 1904.
H. LIPPELT.
ELECTRICAL INDUCTION MACHINE.
APPLICATION FILED JAN. 13, 1903.
NO MODEL. 9 SHEETS—SHEET 9.
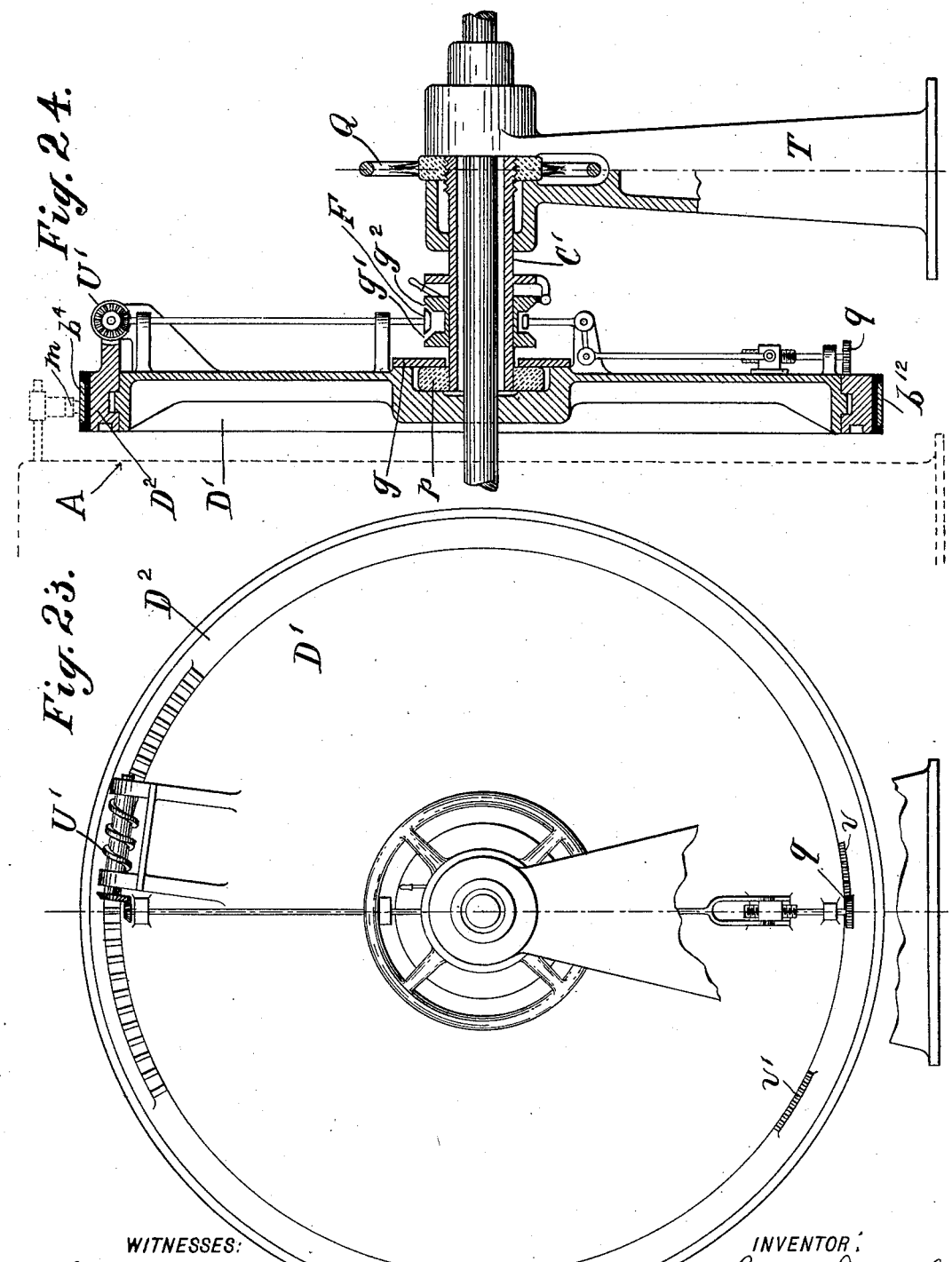

No. 756,793. Patented April 5, 1904.

UNITED STATES PATENT OFFICE.

HANS LIPPELT, OF NEW YORK, N. Y.

ELECTRICAL INDUCTION-MACHINE.

SPECIFICATION forming part of Letters Patent No. 756,793, dated April 5, 1904.

Application filed January 13, 1903. Serial No. 138,802. (No model.)

*To all whom it may concern:*

Be it known that I, HANS LIPPELT, a citizen of the German Empire, residing at New York, in the county of New York and State of New York, have invented certain new and useful Improvements in Electrical Induction-Machines, of which the following is a specification.

My invention has reference to improvements in electric induction-machines, and particularly to direct-current machines, such as dynamos, motors, and transformers. In electric machines of this description, particularly in direct-current dynamos or motors, the windings of the armature are arranged in series, so that the same current passes through all the elementary conductors, while the tension naturally varies. Commutation for carrying off the direct current can therefore only be effected by short-circuiting the elements, which causes sparking at the brushes, with a consequent loss of efficiency and a derogatory mechanical effect in the action of the machine. In the several types of direct-current machines the tension of the current cannot be regulated to any high desired intensity.

The nature of my invention will best be understood when described in connection with the accompanying drawings, in which—

Figure 13:
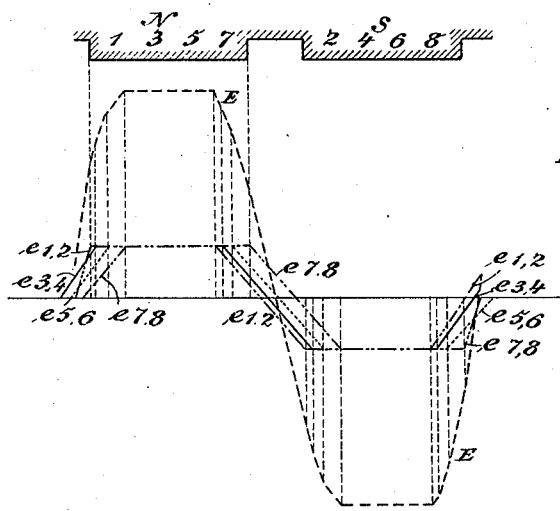
Figure 14:
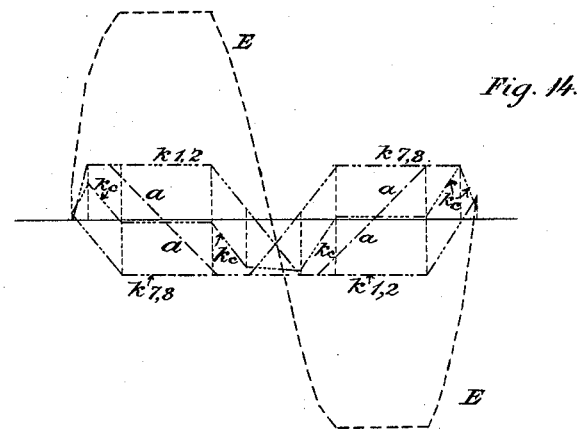
Figure 15:
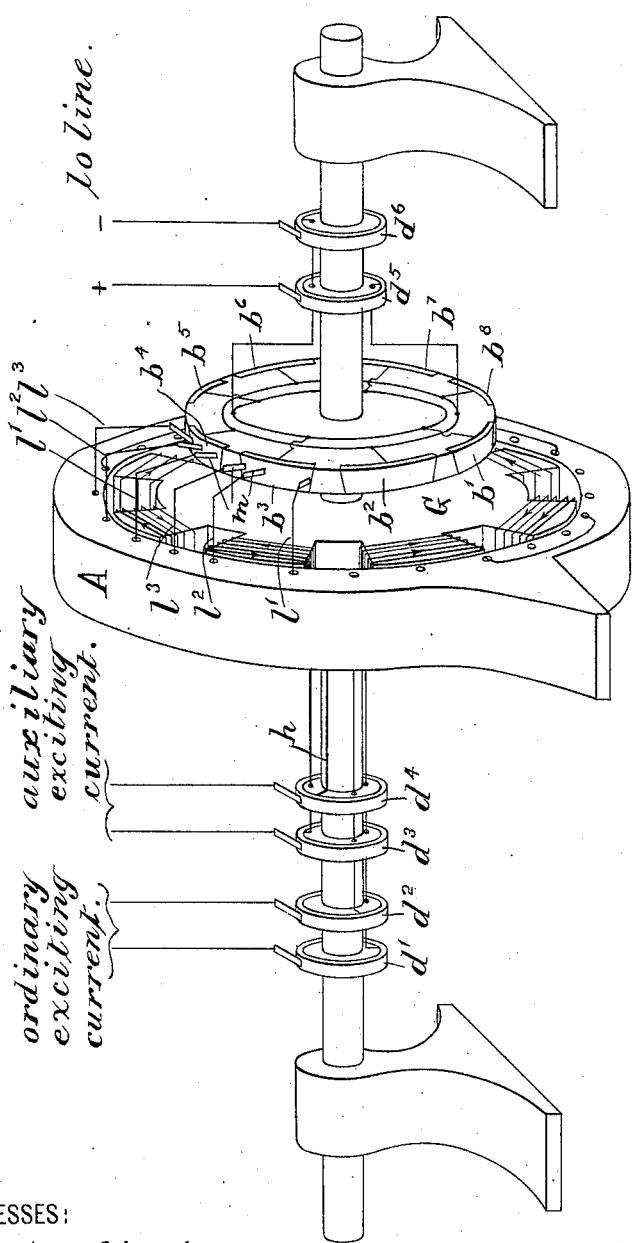
Figure 16:
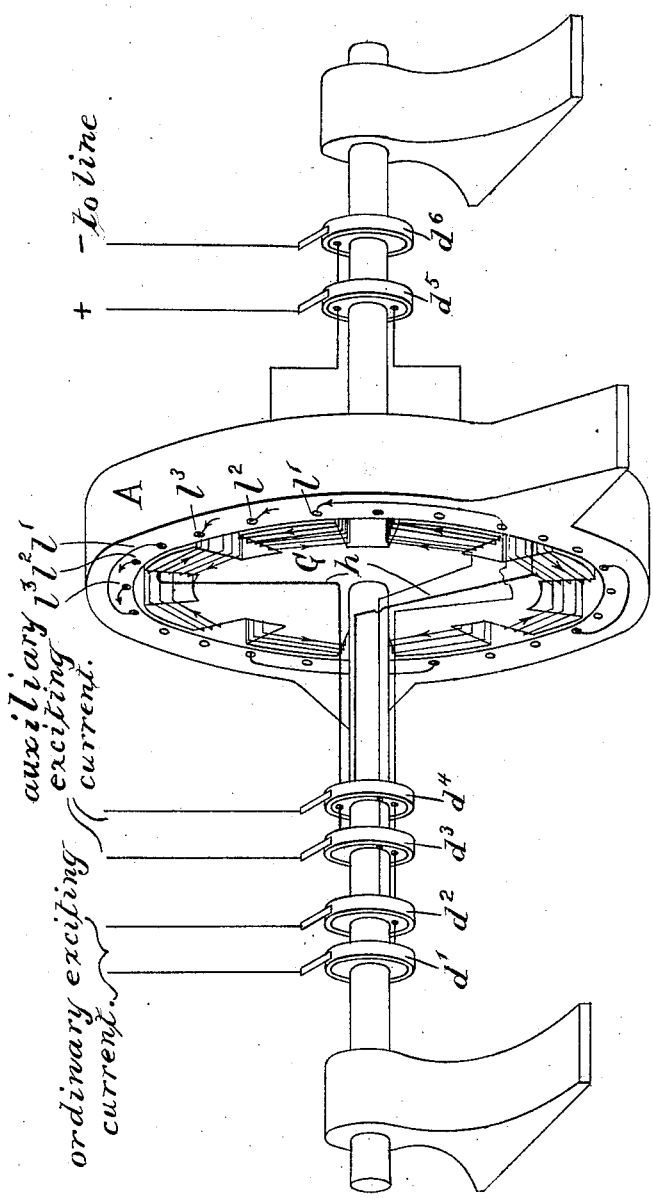
Figure 17:
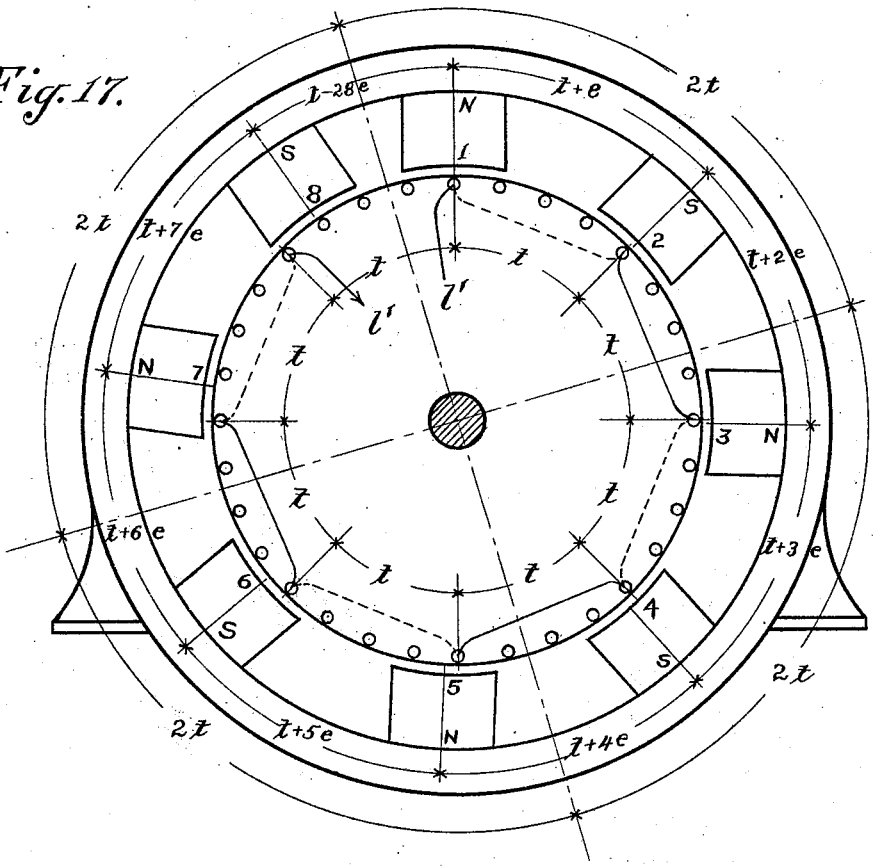
Figure 18:
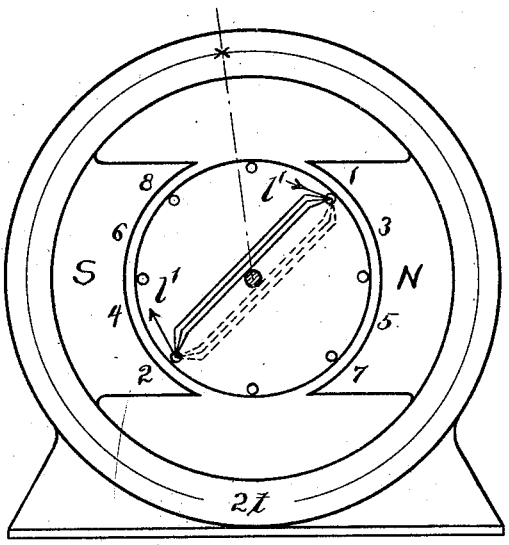

Figure 1 represents a diagrammatic view of a bipolar direct-current dynamo embodying my invention. Figs. 2 and 3 are developments in a horizontal plane, illustrating the construction and winding. Fig. 4 is a diagram illustrating the variation in quantity of current and magnetic field. Fig. 5 illustrates a ring form for the field-magnets of an eight-pole machine. Fig. 6 is a similar view to Figs. 2 and 3, but illustrating the eight-pole machine of Fig. 5. Figs. 7, 8, and 9 are similar views illustrating the windings of the armature of the eight-pole machine shown in Fig. 5 for the purpose of obtaining a higher electromotive force. Figs. 10 to 14 are diagrams illustrating several methods of counteracting the action of the magnetic fields of the armature. Figs. 15 and 16 show the front and rear view of a machine embodying a stationary armature, same being in perspective. Fig. 17 shows an eight-pole machine with unequally-spaced poles. Fig. 18 shows the same machine changed to a two-pole machine for the purpose of illustrating the operation. Figs. 19 to 24 show various means for adjusting the relative position of collectors and conductors or collectors and brushes.

Similar letters of reference designate corresponding parts throughout the several views of the drawings.

Figure 19:
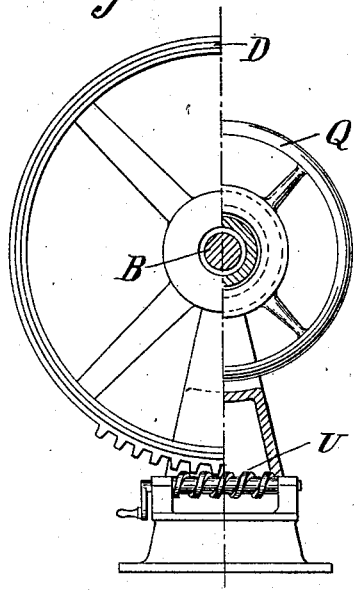
Figure 20:
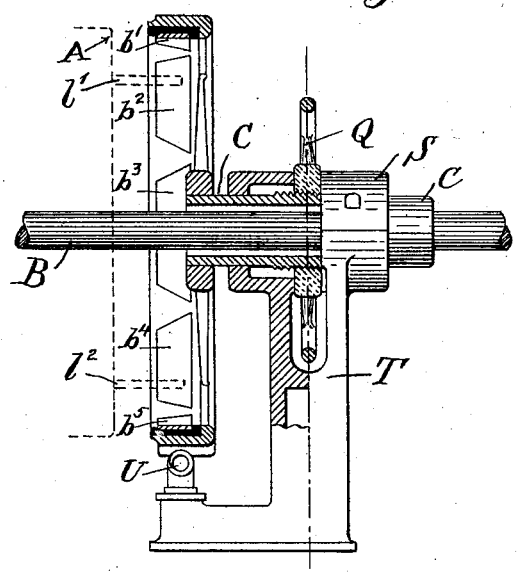

Referring at present to Fig. 1 of the drawings, the letter G designates a usual casing provided with two magnetic poles N and S, as usual, and between which poles and in the magnetic field thereof is placed an armature A, having on its periphery longitudinal conductors $l'$ $l^2$, &c., inserted, preferably, in suitable grooves and secured in any well-known manner. The conductors are made of wire, rods, or bars of metal of suitable cross-section and of comparatively small width relative to the direction of the circumference of the armature. The free ends of the conductors project beyond the ends of the core of the armature A and are engaged by collectors $b'$ $b^2$, Figs. 3 and 15, at their rear ends and by collectors $b^\times$ $b^\times$ at their front ends, such collectors being fixed and the front collectors at the same time also forming the electric poles of the machine. The conductors engaged simultaneously by the same collectors practically form but one electric conductor, and it is advisable to have as large a number of such conductors as may be consistent in practice, so that each conductor has to carry a relatively small portion of the whole current, and the eddy-currents are avoided. It is of course to be understood that at least one conductor should always be between successive collectors. The smallest number of conductors that can be employed depends upon the condition that at all times and in every position of the armature at least one conductor slides in contact with every set of front and rear collectors in order to prevent interruption of the current. The length of the arc of contact between the conductors and collectors $b^\times$ and $b'$, $b^2$ and $b^\times$, as expressed by degrees of a circle, is about the same as the length of the poles N and S on an arc comprised within radii drawn to the center of the armature. This will readily be seen from Figs. 1 and 3 and the diagram in Fig. 4, in which latter figure the base-line $f'\,f^4$ is the periphery of the armature developed. The conductors $l'\,l^2$, &c., which are not adjacent to the collectors, are naturally switched out at both ends. When the dynamo is in operation, the electromotive force in each one of the conductors $l'\,l^2$, &c., is proportional to the strength of the magnetic field at the respective point. This statement and the conclusions deducted therefrom are reliable, because the conductors have but a comparatively small extension with respect to the direction of the periphery of the armature. The conductors which are between the points $f'\,f^2$ and $f^3\,f^4$ of the magnetic field will have nearly equal electromotive force, since, as shown, they are placed in parallel by the collectors $b'\,b^\times$ and $b^2\,b^\times$, and consequently conduct to the same a certain quantity of current. The direction of the current is then from the collector $b^\times$ on the left hand of Fig. 3, forming the negative pole of the machine, toward the conductors $l^2\,l^3$, &c., connected therewith, as shown, through the same to the opposite collector $b'$, from thence through the wire $w$ to the collector on the right-hand side $b^2$, is distributed over the conductors adjacent thereto, passes through them, and is received by the collector $b^\times$ to the right and in front, which forms the positive pole of the machine, and from thence it runs into the line. In the conductors passing the sloping parts of the magnetic field the electromotive force will be proportionally smaller. When the tension has been reduced to that between the front and rear collectors—that is to say, to the pole tension between the same—the supply of current to the respective collectors ceases, and at this instant the conductors should leave the front and rear collectors. After this the electromotive force in the conductors will go down to zero and then change to the opposite direction until it again reaches the pole tension of the next pair of collectors, at which instant the conductors must pass between the corresponding pair of collectors, when they again take part in the supply of current, and so on. As the switching in and out of the elementary conductors on the collectors takes place when there is no current, but when the tension is balanced, no self-induction takes place and no sparks are formed. Since the conductors are not connected by cross-connecting pieces and are switched in and out at the beginning and end, the potential of the conductors is not affected or influenced by the electricity in the active conductors. While one elementary conductor travels from one pair of collectors to the other its potential changes exactly as the potential difference in the space between the collectors $b^\times$ and $b^\times$. The whole process of switching as well of the work done by the elementary conductors is proportioned to existing conditions of magnetic and electric tensions. Nowhere violent actions take place, and sparking is completely avoided. Since when the machine is doing work the magnetic field curve varies a little, the lengths of the collectors $b'\,b^2\,b^\times\,b^\times$ must be varied correspondingly, which is practically done without difficulty. The simplest form is to make the collectors taper on the faces adjacent to the conductors, as shown in Fig. 3, and render the same adjustable in and out in a usual manner. Figs. 19 and 20 show an end view and a side elevation, partly in section, of an arrangement for this purpose, the collectors $b'\,b^2$, &c., being secured within a stationary frame D, mounted concentrically with the dynamo-shaft B upon a sleeve C, which sleeve is guided within the head S of a fixed standard T. Part of the sleeve C is threaded to engage a corresponding thread in the hub of a hand-wheel Q, which is held against longitudinal motion within a jaw of the standard T. By turning the hand-wheel Q longitudinal motion is imparted to the sleeve C and through it to the frame D, holding the collectors $b'\,b^2$, &c. By means of a worm U engaging a circular rack on the frame D the frame can be turned to shift the collectors in a circular path.

In the bipolar machines and with the arrangement of the elementary conductors shown generally no high electric tension will be obtained. Therefore I shall show how any desired tension may be obtained. For this purpose the elementary conductors are replaced by coils with a large number of windings. For the purpose of a better understanding I shall show this in connection with multipolar machines, which are more suitable for high tensions.

In Figs. 5 and 6 I have shown a multipolar ring with an inclosed armature which may be of any of the constructions shown in Figs. 7, 8 and 9. These figures are intended to show different methods of winding the armature; but it is to be understood that I do not wish to confine myself to any particular method or manner of winding the armature. Referring particularly to Fig. 7, the armature is shown to be wound with a wave winding about three elementary conductors $l^2$, $l^6$, and $l^8$. Small circles indicate the grooves for the winding of the remaining conductors $l'\,l^3\,l^4$, &c. The angular distance between the successive and parallel parts of every elementary conductor upon the surface of the armature is equal to $$t = \frac{2\pi}{\text{number of poles}} \text{ respectively} = \frac{360 \text{ degrees}}{\text{number of poles}}$$

or a direct multiple of the same. As shown in Fig. 7, each elementary conductor is carried but once around the armature. For increasing the effect a plurality of parallel windings may be made, thus producing spools. In the armature shown in Fig. 7 the direction of the current is as follows: Let the front collector $b^\times$ to the left be the negative pole and the collector $b^\times$ to the right be the positive pole, which designations are adopted for all the remaining figures. Then the current from the negative collector $b^\times$ goes into the elementary conductors $l^2$ $l^3$, ($l^3$ not shown,) runs through the same in the above-mentioned wave-line around the whole armature and then passes to the rear into the collector $b'$, thence to the conductors $l^5$ and $l^6$, ($l^5$ not shown,) passes through this conductor around the armature into the first intermediate collector $b^2$ in front. This intermediate collector in front takes the current to the conductors $l^8$ $l^9$, ($l^9$ not shown.) In these conductors $l^8$ $l^9$ the current again passes around the armature to the second intermediate rear collector $b^3$. This process is repeated until the current has reached the positive pole—that is, the right-hand-box collector $b^\times$. It is of course to be understood that it is unnecessary to pass around the entire armature with the undulating line of wire, but that the progression of winding may be interrupted when recommenced, as shown in Fig. 8. The run of the current is in this case exactly the same as described in connection with Fig. 7 with the only difference that the elementary conductors have a smaller number of waves than in Fig. 7.

In Fig. 9 I have shown how this principle of winding may be applied to the elements or conductors influenced upon simply by one pole of a multipolar machine. The collectors in this case are approximately one-half the length of those in the machines previously specified. The collectors are all placed at the front of the machine in two rows and all in electrical connection alternately or otherwise, according to existing conditions. In this case in addition to the positive and negative poles $b^\times$ and $b^\times$ intermediate positive and negative collectors $b'$ $b^2$, &c., appear. The current in this case passes from the negative collector $b^\times$ to the conductors $l^2$ $l^3$, connected thereto, and passes through them around the armature to the positive collector $b^\times$. In the further rotation of the armature the same conductors come into contact with intermediate collectors $b'$, $b^2$, $b^3$, $b^4$, $b^5$, and $b^6$, and in this case the intermediate collectors $b'$ $b^3$ $b^5$ and $b^2$, $b^4$, and $b^6$ form the functions of the main collectors $b^\times$. From the intermediate collectors the current goes to the main collectors $b^\times$ $b^\times$ and is distributed to the line. The last-described method of winding is particularly suitable for high-tension machines.

Figure 21:
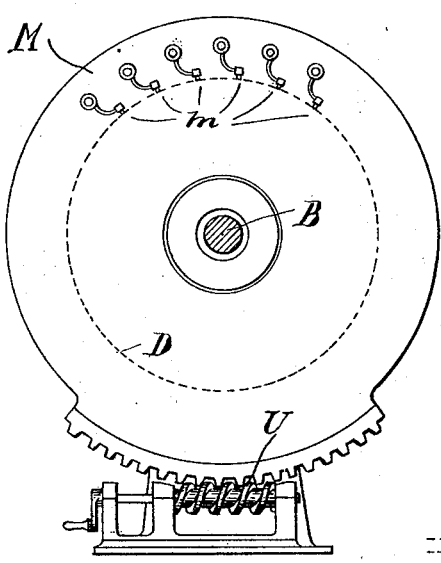
Figure 22:
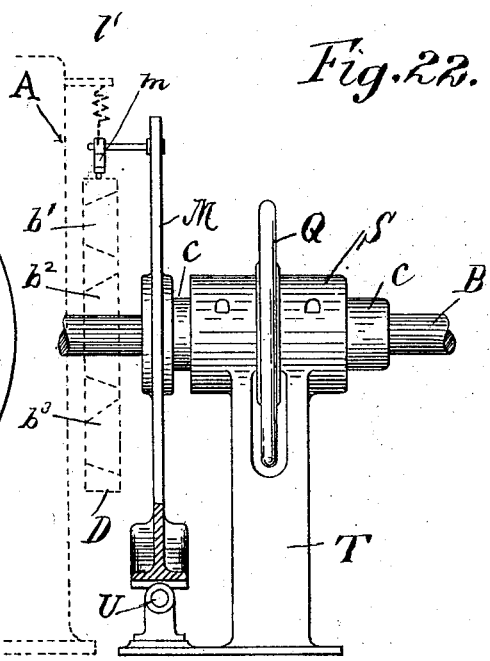

It is of course to be understood that in the several machines described the armature could be made stationary and the remaining parts caused to rotate about the same—that is to say, the system of magnets could be made the movable part, while the armature would then be the stationary part, similar to alternating-current machines, as best seen in Figs. 15 and 16. In this case I prefer to provide the several conductors with short brushes adapted to engage with the collectors at the proper points. In Figs. 15 and 16 the letter A designates the stationary armature, and the letter G the magnetic field system rotating within the same. On the armature are disposed three elementary conductors $l'$ $l^2$ $l^3$, the ends of which are formed by brushes $m$. These brushes slide upon the rotating collectors $b'$ $b^2$ $b^3$, &c., which collectors are alternately connected into two groups. One of these groups of collectors is connected to the rotating contact-ring $d^5$, the other group to the rotating contact-ring $d^6$. Upon each of these contact-rings bears a fixed brush, one of them forming the positive and the other the negative pole of the machine. The rotating magnetic-field system is provided with a winding of thin wire for the ordinary exciting-current, which passes off through the contact-rings $d'$ and $d^2$; also, with an auxiliary winding $h$, into which by means of the contact-rings $d^3$ and $d^4$ an auxiliary exciting-current is supplied. The explanation of the latter is given farther on. In view of the fact that the armature is stationary a proper form of insulation—that is to say, a most suitable form—can be obtained, and consequently any desired tension can be carried without danger of burning out the wires. The adjustment of the relative positions of the stationary brushes $m$ (connected to the conductors) and of the rotating collectors $b'$ $b^2$, &c., is in this case made by means such as shown in Figs. 21 and 22, which differ from Figs. 19 and 20 by having the frame D, containing the collectors $b'$ $b^2$, &c., fixed upon the shaft B, so as to rotate with it. The brushes are mounted upon a stationary disk M, actuated by the hand-wheel Q in the same manner as the frame D in Fig. 20, so as to make adjustment parallel to the axis. By means of a worm U, engaging a segmental rack on the disk M, circular adjustment of the brushes is effected.

Figs. 23 and 24 show another arrangement for stationary armature and rotating collectors. The longitudinal adjustment of the rotating frame $D'$ $D^2$ is made in a similar way as the adjustment of the frame D of Fig. 20, a swivel-joint being formed between the rotating frame $D'$ $D^2$ and the sleeve $C'$ by the flange $p$ at the inner end of the sleeve $C'$. The frame $D^2$, holding the collectors $b'$ $b^2$, &c., can be turned to a limited degree on the frame $D'$ by a worm-gear $U'$, which may be turned by a conical wheel F, rotating with the frame $D'$ $D^2$ and actuated by cones $g'$ or $g^2$, which are thrown into action one way or the other by a shifting-lever. Excessive motion is prevented by a reversing-gear, (indicated on the lower sides of Figs. 23 and 24,) the pinion $q$ meeting racks $v$ or $v'$ and throwing the cones back.

It is of course to be understood that the principle of my invention may be equally well applied to dynamos, motors, and transformers. In the latter case and when the system of magnets rotates the same has no mechanical energy to transmit and can then be made comparatively light.

The change in the form of the magnetic-field curve shown in Fig. 4 relative to a loaded machine is caused by the magnetic field created within the armature. I will now proceed to show how the action of the armature-field may be neutralized, thereby causing the flat parts of the curve of electromotive force to be retained at all loads. Let it be assumed, as an example, that the armature is wound on the principle shown in Figs. 7 or 9, thus causing each conductor to pass through the entire magnetic field of the dynamo or motor. Referring now to Fig. 10, $e$ represents the curve of the magnetic field of a pair of poles of, say, for instance, an eight-pole machine. Then $e$ also represents the electromotive force of the current induced within a conductor passing this pair of poles. If this conductor is part of an elementary spool, as in Fig. 9, there is generated in this elementary conductor an electromotive force equal to eight times the value of $e$. This electromotive force is produced by four pairs of poles, and therefore the curve $e^4$, whose ordinates for each abscissa are equal to four times the ordinates of the curve $e$, may be considered as the magnetic-field curve of a bipolar machine, which is perfectly true of the eight-pole machine. Of all the conductors carried by the armature only those are vitalized by currents which are engaged by the collectors—that is, those which are situated in the flat part of the field curve—and these conductors create magnetic fields the sum of which is represented by the curve $a$. The magnetic field of the armature acts in opposition to the magnetic field of the poles, so that the curves $e^4$ and $a$ have a result in curve $r$ equal to the algebraic difference of the curves $e^4$ and $a$—that is, $r = e^4 - a$. If the action of the armature magnetic field should not now be counteracted, the resulting curve would be as indicated by $r$. If the action of the armature-field is not counteracted, then the curve of the electromotive force is similar to $r$. In order that such a result should not occur, an additional field $x$ must be generated which coöperates with the field $r$, and the value of this field may be expressed by the formula $r + x = e^4$. Since $r = e^4 - a$, then $(e^4 - a) + x = e^4$—that is, $x = + a$. From this it will be understood that the new magnetic field $x$ to be generated must have the same curve as the armature-field $a$. In the same manner that the curve $e$, respectively, the curve $e^4$ has been derived from the position and width of the poles N S, Fig. 10, so can also the length and width of the auxiliary poles 9 and 10 be derived in an opposite manner from the curve $x$, being equal to the curve $a$. These auxiliary poles are then further to be arranged in the frame. The number of poles is consequently increased. For the lower part of the curve $a$ there is a pole 10. (See Figs. 10 and 11.) For the part of the curve $a$ which runs above the axes of the abscissas a pole 9 would result, Fig. 10, of the same size as pole 10. The arrangement of pole 9 within the frame cannot well be effected, because the pole 9 would almost touch the pole 8, Fig. 11, or the pole 1 if it were placed to the right of pole 10. To avoid these difficulties of construction, the curve $a$ above the abscissas is divided into equivalent curves $x'$ and $x^2$, and then from these two curves the poles $9^a$ and $9^b$ are derived, which are easily placed within the frames. (See Fig. 11.) The curves $x'$ and $x^2$ give in conjunction the same horizontal action as the curve $a$ at the corresponding place. Pole 10 is to be excited as the south pole and the poles $9^a$ and $9^b$ as the north poles. The exciting of these auxiliary poles must be carried to a degree equaling that of the armature, for which purpose it is best to use the armature-current for the formation of the auxiliary field, which is then provided with main-current windings. This has the additional advantage that when the armature-current is reversed the polarity of the auxiliary poles is likewise reversed, and this must be so for the reason that in the example illustrated the polarities of the armature-field are likewise reversed. Consequently this arrangement works effectively whether the machine runs as a motor or as a dynamo. The arrangement of the auxiliary poles $9^a$, $9^b$, and 10 does not prevent distortion in the fields between the poles 1 to 8; but the total inductive action is directive, as if no distortion of the field were present—that is, the curve of electromotive force retains its flat parts under varying loads. Of course in this machine the armature should be wound as for a ten-pole machine and not for an eight-pole machine, and therefore a new armature-field is formed, which, however, does not interfere with the efficiency of the machine in view of the correspondingly stronger magnetization of the auxiliary poles. If it is desired to avoid the insertion of auxiliary poles, the flat form of electromotive curve may also be secured for all loads by arranging the poles in the frame at unequal distances from each other.

Figure 12:
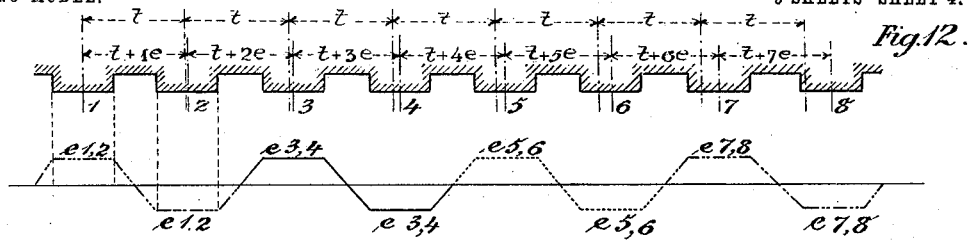

Fig. 12 represents the development of an eight-pole machine of this description, which is further illustrated in Fig. 17. Referring to these figures, if $$t = \frac{2\pi}{\text{number of poles}},$$

the normal division, then the several poles have the distances from each other equal to $t+e$, $t+2e$, $t+3e$ to $t+7e$, wherein $e$ represents a certain small increment which may be either positive or negative. The law of the unequal division may be selected at will, according to desire and purpose. The armature is presumed to be wound as in Figs. 7 or 9—that is to say, as if the winding-step remains the same around the armature. In the development the phases of the magnetic field is marked $e$—1 2, $e$—3 4, $e$—5 6, and $e$—7 8. If this machine is reduced to a bipolar machine, as above, such parts whose angular distance is $2t$ will have to be above each other, according to the distance of those parts of the elementary conductors, which are induced in the same direction. This reduction is shown merely in diagram in Fig. 18—that is to say, not intended to be used in the construction of a machine, but simply to serve for the better understanding of the operation of the eight-pole machine shown in Fig. 17. In Fig. 18 the division $2t$ corresponds to the whole periphery of the two-pole machine. Fig. 13 shows this arrangement on a scale twice as large as Fig. 12, and at the same time the addition of the several magnetic field curves $e$—1 2, $e$—3 4, $e$—5 6, $e$—7 8, as carried out, shows the formation of the curve E. In Fig. 14 the curve $a$ represents the sum of four armature-fields, and the question is simply to generate within the magnetic poles in addition to the normal magnetization sufficient magnetism to create a field curve corresponding to $a$. If the first pair of poles 1 2 is excited in a higher degree, the curve $k$—1 2 is formed, representing only the increase of magnetism. If the magnetism is decreased in the poles 7 and 8 to the same amount, the curve $k$—7 8 is formed, representing only the decrease of magnetism. The sum of the curves $k$—1 2 $k$—7 8 gives the curve $kc$, and it is seen that the curve $kc$ runs about the same as the curve $a$. For effecting the above-mentioned changes of magnetization the respective poles are provided with an auxiliary winding. (See $h$, Figs. 15 and 16.) The same is so arranged that the auxiliary current therein passes around the poles to be strengthened in the same direction as the ordinary exciting-current, while the auxiliary current passes around the poles to be weakened in opposite direction to the ordinary exciting-current. Owing to this way of directing the auxiliary current, the same created on the poles to be strengthened a positive curve and on the poles to be weakened a negative curve. It must be borne in mind that a negative curve is equivalent to a positive curve at an angular distance of one hundred and eighty degrees. The additional excitation of the poles 1 2 and the weakening of the poles 7 8 must be carried so far that the surface covered by the curve $kc$ is equal to the surface covered by the curve $a$, and then the reaction of the armature ceases. If then the remaining poles are regulated in the same manner, the compensating action of the first and last pairs of poles is increased. The cessation of the reaction of the armature is in this case effected directly by annuling the field distortion. The change in the excitations of the several poles mentioned may be conveniently effected through the armature-current. For this purpose the respective poles may be provided with an auxiliary current-winding $h$, Figs. 15 and 16. The arrangement then answers for the purpose of a dynamo or motor.

It is to be understood that the auxiliary poles hereinbefore described may be regarded as a special case of the arrangement of poles with unequal divisions, just described, in which case only the last north pole and last south pole are unequally spaced.

In the machines shown and described the length of the flat part of the electromotive-force curve may be maintained for all loads. Sparking at the brushes or collectors is prevented and all regulations are made as required by the internal conditions. Furthermore, the arrangement of the magnets and armatures may be applied to alternating-current machines, and by combining both the principle of the dynamo and the motor in one machine a transformer is produced which is adapted to transform a direct current into a direct current, or into an alternating current, and an alternating current into a direct current.

What I claim as new is—

1. In an electric induction-machine, the combination of an armature with a plurality of magnetic poles, means for inducing relative motion between the armature and the poles, conductors arranged on said armature and of relatively small width compared to the periphery of the armature and extending one or several times under one or under a plurality of the magnetic poles and their ends extending beyond the armature; collectors disposed relative to the ends of the conductors and constructed to vary the length and place of contact with one or more of the conductors and arranged at intervals concentric with the shaft and collecting and carrying the current only from such conductors as are effectively vitalized, and said collectors causing said conductors to be arranged in parallel circuits and switching in conductors of substantially rising tension and switching out conductors of sinking tension and so producing equal tension in the active conductors, substantially as described.

2. In a direct-current dynamo, the combination of a stationary armature with a plurality of magnetic poles, means for inducing relative motion between the armature and the poles, conductors arranged on said armature and of relatively small width compared to the periphery of the armature and extending one or several times under one or under a plurality of the magnetic poles and their ends extending beyond the armature; collectors disposed relative to the ends of the conductors and constructed to vary the length and place of contact with one or more of the conductors and arranged at intervals concentric with the shaft, and collecting and carrying the current only from such conductors as are effectively vitalized and said collectors causing said conductors to be arranged in parallel circuits and switching in conductors of substantially rising tension and switching out conductors of sinking tension, and so producing equal tension in the active conductors, substantially as described.

3. In a direct-current machine, the combination with the magnetic poles, of an armature; conductors arranged on the armature concentrically to the shaft and extending beyond the armature, two or more such conductors for the length of the arc occupied by each magnetic pole and one or more for the aggregate arc of each magnetic pole and the space between such pole and the next succeeding or preceding pole; collectors arranged concentrically to the shaft with intermediate spaces the collectors about the length of the poles spaced between the poles; the conductors and collectors arranged in sliding contact whereby it is made possible to switch out of the circuit a suitable number of conductors in their passage from one magnetic pole to the next succeeding opposite pole for the purpose of obtaining a more constant current, and to connect all conductors in parallel, or any desired number of conductors in series, substantially as and for the purpose specified.

4. In an electric induction-machine, the combination of an armature with a plurality of magnetic poles, means for inducing relative motion between the armature and the poles, conductors arranged on said armature and of relatively small width compared to the periphery of the armature and extending one or several times under one or under a plurality of the magnetic poles, and their ends extending beyond the armature; collectors disposed relative to the ends of the conductors and constructed to vary the length and place of contact with one or more of the conductors and arranged at intervals concentric with the shaft, and collecting and carrying the current only from such conductors as are effectively vitalized, and said collectors causing said conductors to be arranged in parallel circuits and switching in conductors of substantially maximum rising tension and switching out conductors of sinking tension, and so producing equal tension in the active conductors, substantially as described.

5. In an electric induction-machine, the combination of an armature with a plurality of magnetic poles, means for inducing relative motion between the armature and the poles, conductors arranged on said armature and of relatively small width compared to the periphery of the armature and extending one or several times under one or under a plurality of the magnetic poles, and their ends extending beyond the armature; collectors disposed relative to the ends of the conductors and constructed to vary the length and place of contact with one or more of the conductors and arranged at intervals concentric with the shaft, and collecting and carrying the current only from such conductors as are effectively vitalized and said collectors causing said conductors to be arranged in parallel circuits and switching in conductors of substantially rising tension and switching out conductors of sinking tension and so producing equal tension in the active conductors, and means for counteracting distortion of the magnetic field, substantially as described.

6. In an electric induction-machine, the combination of an armature with a plurality of magnetic poles, means for inducing relative motion between the armature and the poles, conductors arranged on said armature and of relatively small width compared to the periphery of the armature and extending one or several times under one or under a plurality of the magnetic poles, and their ends extending beyond the armature; collectors disposed relative to the ends of the conductors and constructed to vary the length and place of contact with one or more of the conductors and arranged at intervals concentric with the shaft, and collecting and carrying the current only from such conductors as are effectively vitalized and said collectors causing said conductors to be arranged in parallel circuits and switching in conductors of substantially rising tension and switching out conductors of sinking tension and so producing equal tension in the active conductors, and means for counteracting the reaction of the armature, substantially as described.

7. In an electric induction-machine, the combination of an armature with a plurality of magnetic poles arranged at unequal distances, means for inducing relative motion between the armature and the poles, conductors arranged on said armature and of relatively small width compared to the periphery of the armature and extending one or several times under one or under a plurality of the magnetic poles, and their ends extending beyond the armature; collectors disposed relative to the ends of the conductors and constructed to vary the length and place of contact with one or more of the conductors and arranged at intervals concentric with the shaft, and collecting and carrying the current only from such conductors as are effectively vitalized, and said collectors causing said conductors to be arranged in parallel circuits and switching in conductors of substantially maximum rising tension and switching out conductors of sinking tension, and so producing equal tension in the active conductors, substantially as described.

8. In an electric induction-machine, the combination of an armature with a plurality of magnetic poles, means for exciting said poles with different strength and polarity, means for inducing relative motion between the armature and the poles, conductors arranged on said armature and of relatively small width compared to the periphery of the armature and extending one or several times under one or under a plurality of the magnetic poles, and their ends extending beyond the armature; collectors disposed relative to the ends of the conductors and constructed to vary the length and place of contact with one or more of the conductors and arranged at intervals concentric with the shaft, and collecting and carrying the current only from such conductors as are effectively vitalized, and said collectors causing said conductors to be arranged in parallel circuits and switching in conductors of substantially maximum rising tension and switching out conductors of sinking tension, and so producing equal tension in the active conductors, substantially as described.

9. In an electric induction-machine, the combination of an armature with a plurality of magnetic poles and auxiliary poles arranged with abnormal division, means for exciting said auxiliary poles with different strength and polarity, means for inducing relative motion between the armature and the poles, conductors arranged on said armature and of relatively small width compared to the periphery of the armature and extending one or several times under one or under a plurality of the magnetic poles, and their ends extending beyond the armature; collectors disposed relative to the ends of the conductors and constructed to vary the length and place of contact with one or more of the conductors and arranged at intervals concentric with the shaft, and collecting and carrying the current only from such conductors as are effectively vitalized, and said collectors causing said conductors to be arranged in parallel circuits and switching in conductors of substantially maximum rising tension and switching out conductors of sinking tension, and so producing equal tension in the active conductors, substantially as described.

10. In an electric induction-machine, the combination of an armature with a plurality of magnetic poles arranged at unequal distances, means for exciting said poles with different strength and polarity, means for inducing relative motion between the armature and the poles, conductors arranged on said armature and of relatively small width compared to the periphery of the armature and extending one or several times under one or under a plurality of the magnetic poles, and their ends extending beyond the armature; collectors disposed relative to the ends of the conductors and constructed to vary the length and place of contact with one or more of the conductors and arranged at intervals concentric with the shaft, and collecting and carrying the current only from such conductors as are effectively vitalized, and said collectors causing said conductors to be arranged in parallel circuits and switching in conductors of substantially maximum rising tension and switching out conductors of sinking tension, and so producing equal tension in the active conductors, substantially as described.

11. In an electric induction-machine, the combination of an armature with a plurality of magnetic poles being arranged at unequal distances and auxiliary magnetic poles at unequal distances, means for exciting said poles with different strength and polarity, means for inducing relative motion between the armature and the poles, conductors arranged on said armature and of relatively small width compared to the periphery of the armature and extending one or several times under one or under a plurality of the magnetic poles, and their ends extending beyond the armature; collectors disposed relative to the ends of the conductors and constructed to vary the length and place of contact with one or more of the conductors and arranged at intervals concentric with the shaft, and collecting and carrying the current only from such conductors as are effectively vitalized, and said collectors causing said conductors to be arranged in parallel circuits and switching in conductors of substantially maximum rising tension and switching out conductors of sinking tension, and so producing equal tension in the active conductors, substantially as described.

In testimony whereof I have hereunto set my hand in the presence of two subscribing witnesses.

HANS LIPPELT.

Witnesses:
RAENA H. YUDIZKY,
A. FABER DU FAUR, Jr.